United States Patent
Durocher et al.

(10) Patent No.: US 11,480,475 B2
(45) Date of Patent: Oct. 25, 2022

(54) METHOD AND SYSTEM FOR MEASURING TEMPERATURE IN A GAS TURBINE ENGINE

(71) Applicant: PRATT & WHITNEY CANADA CORP., Longueuil (CA)

(72) Inventors: Eric Durocher, Boucherville (CA); Scott Smith, St-Lambert (CA); Guy Bouchard, Mont Saint-Hilaire (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 511 days.

(21) Appl. No.: 16/502,341

(22) Filed: Jul. 3, 2019

(65) Prior Publication Data
US 2021/0003458 A1    Jan. 7, 2021

(51) Int. Cl.
| | | |
|---|---|---|
| *G01K 3/02* | (2006.01) | |
| *G01K 7/02* | (2021.01) | |
| *G01K 13/02* | (2021.01) | |
| *F02C 9/18* | (2006.01) | |
| *B01F 23/10* | (2022.01) | |
| *G01K 13/024* | (2021.01) | |
| *G01K 3/00* | (2006.01) | |

(52) U.S. Cl.
CPC ............... *G01K 7/02* (2013.01); *B01F 23/19* (2022.01); *F02C 9/18* (2013.01); *G01K 13/02* (2013.01); *F05D 2220/32* (2013.01); *F05D 2270/303* (2013.01); *G01K 3/00* (2013.01); *G01K 13/024* (2021.01)

(58) Field of Classification Search
CPC ........ G01K 7/02; G01K 13/02; G01K 13/024; G01K 2205/02; G01K 1/14; G01K 13/028; G01K 1/08; G01K 7/16; G01K 15/005; G01K 3/06; B01F 3/026; F02C 9/18; F02C 7/04; F02C 7/18; F02C 7/185; F02C 7/047; F02C 7/16; F02C 6/08; F02C 1/00; F02C 5/00; F05D 2220/32; F05D 2270/303
USPC .......................... 374/141, 115, 137, 110, 144
See application file for complete search history.

(56) References Cited

U.S. PATENT DOCUMENTS

| | | | |
|---|---|---|---|
| 2,806,078 A * | 9/1957 | Robinson | H01M 6/08 429/169 |
| 3,623,367 A | 11/1971 | Benedict | |
| 6,270,253 B1 | 8/2001 | Keller | |
| 2012/0044969 A1* | 2/2012 | Zebrowski | G01K 3/06 374/E1.001 |
| 2018/0128187 A1 | 5/2018 | Schwarz et al. | |
| 2019/0211704 A1* | 7/2019 | Whittle | F01D 5/284 |
| 2020/0340903 A1* | 10/2020 | Roben | B60H 1/008 |
| 2020/0392896 A1* | 12/2020 | Thangavel | G01L 19/0092 |

(Continued)

FOREIGN PATENT DOCUMENTS

| | | | | |
|---|---|---|---|---|
| CN | 102607641 A | * | 7/2012 | |
| CN | 102734836 A | * | 10/2012 | ........... F01D 21/003 |
| CN | 106068366 A | * | 11/2016 | ........... F01D 17/085 |

(Continued)

*Primary Examiner* — Gail Kaplan Verbitsky
(74) *Attorney, Agent, or Firm* — Norton Rose Fulbright Canada LLP

(57) ABSTRACT

A system and method for measuring average temperature of gas in an axial cross-section of a gas turbine engine gas path, involving diverting gas samples from different positions in the axial cross-section to a gas mixing chamber and measuring a temperature of the resulting mixed gas.

18 Claims, 16 Drawing Sheets

(56) References Cited

U.S. PATENT DOCUMENTS

2021/0270149 A1* 9/2021 Holl ................. G01K 13/02

FOREIGN PATENT DOCUMENTS

| CN | 106353102 A | * | 1/2017 | |
|----|----|----|----|----|
| CN | 111967187 A | * | 11/2020 | |
| EP | 1467194 A1 | * | 10/2004 | ........... G01N 1/2202 |
| FR | 3110195 A1 | * | 11/2021 | |
| WO | WO-2021194473 A1 | * | 9/2021 | |

* cited by examiner

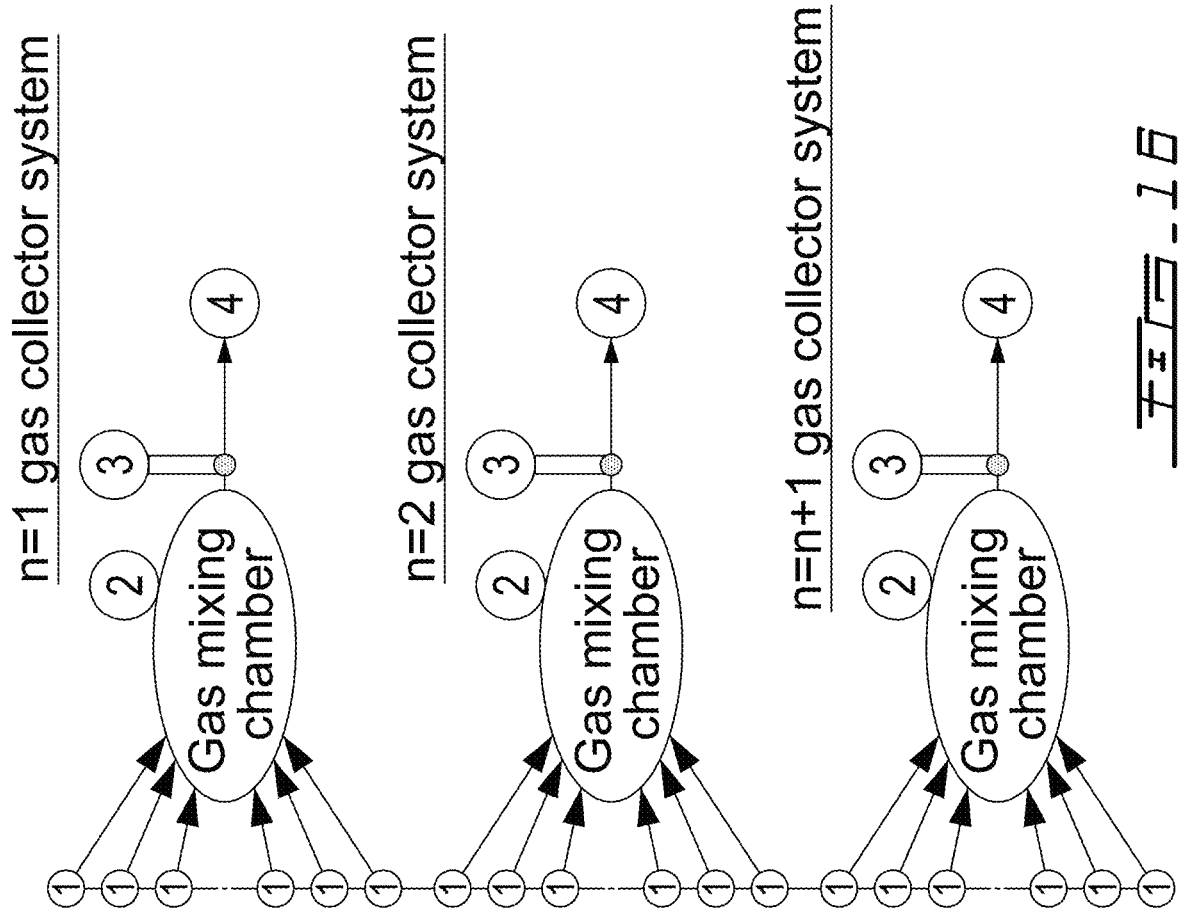

METHOD AND SYSTEM FOR MEASURING TEMPERATURE IN A GAS TURBINE ENGINE

TECHNICAL FIELD

The application related generally to a gas turbine engine and, more particularly, to a method and system to measure temperature in the gas path.

BACKGROUND OF THE ART

Average temperature measurements of axial cross-sections of gas turbine engines are commonly needed during operation of gas turbine engines. The average temperature may be required for a number of reasons including to monitor gas turbine performance, detect faults, or provide feedback to an electronic engine controller (EEC). For example, average temperature of an axial cross-section in an inter-turbine space may be used to determine turbine thermal efficiencies. Obtaining average measurements of a given turbine axial cross-section can be challenging due to circumferential, radial and possibly also temporal temperature fluctuations in the axial cross-section.

SUMMARY

In one aspect, there is provided a method for measuring average temperature of gas in an axial cross-section of a gas turbine engine gas path comprising: diverting a plurality of gas samples from the gas path, each gas sample being diverted from a corresponding position in the axial cross-section, the corresponding positions being circumferentially interspaced from one another around the axial cross-section; mixing the gas samples to form a mixed gas; and measuring a temperature of the mixed gas.

In another aspect, there is provided a gas turbine engine having a gas path extending sequentially across a compressor section, a combustor, and a turbine section, the gas path being annular around an engine axis, the gas turbine engine comprising: a plurality of inlet conduits leading into a gas mixing chamber, each inlet conduit comprising an inlet configured to draw a corresponding gas sample, each gas sample drawn from a position in the axial cross-section of the gas path, the inlets being circumferentially interspaced from one another around an axial cross section of the gas path, the mixing chamber configured to form a mixed gas from the gas samples; and a temperature sensor comprising a probe exposed to the mixed gas.

In a further aspect there is provided an average temperature measurement device for an axial cross-section of a gas turbine gas path, the device comprising: a temperature sensor to measure a temperature of a mixed gas; a gas mixing chamber to obtain the mixed gas; and inlet conduits conveying gas samples from a plurality of circumferential positions in the axial cross-section to the gas mixing chamber.

DESCRIPTION OF THE DRAWINGS

Reference is now made to the accompanying figures in which:

FIG. 16 is a schematic of an embodiment of a gas collector assembly comprising a plurality of a gas collector systems gas collector system for average temperature measurement.

DETAILED DESCRIPTION

Figure 1:
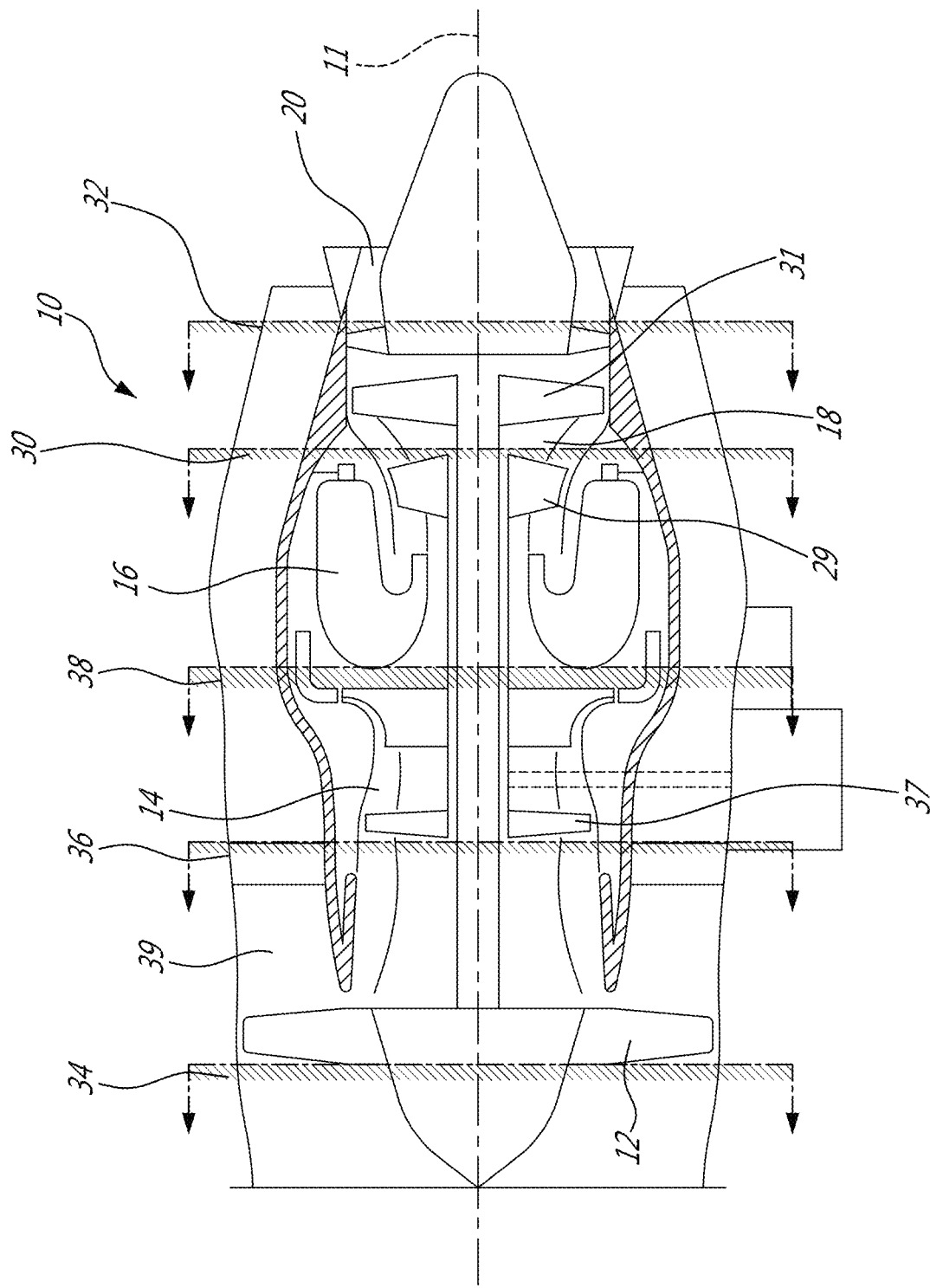
FIG. 1 is a schematic cross-sectional view of a gas turbine engine.

FIG. 1 shows a schematic of a gas turbine engine 10 with a central axis 11 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. After energy extraction, the gas exits the gas turbine through the exhaust 20.

The gas turbine may have a system adapted for measuring average temperature in an axial cross-section of gas turbine engine 10. More specifically, the gas turbine engine 10 includes a plurality of inlet conduit(s) 22 having corresponding inlets 26 circumferentially, and possibly also radially distributed, in the axial cross-section. These inlet conduit(s) 22 may lead to a (gas mixing) chamber 42 where the different samples are mixed to form a mixed gas 48, and it is the temperature of the mixed gas which may be measured. The temperature of the mixed gas may be indicative of the average temperature in the axial cross-section. The different inlets 26 may be at slightly different axial positions, and in other words, the axial cross-section is not intended to be understood as a mathematical plane, and may rather comprise an annular volume with central axis 11, the annular volume being part of the gas path 41. The axial cross-section may thus have a given axial length. In one embodiment, the length is below 1 inch. In another embodiment, the length is below ¼". In still another embodiment, the axial positions of the inlets 26 of inlet conduits 22 can correspond, within a few thousandths of an inch. Measuring the temperature in turbine sections may be more typical, which can be achieved at axial cross-section 30 in an inter-turbine space, e.g. a space between a high-pressure turbine 29 and a low-pressure turbine 31, or axial cross-section 32 adjacent to turbine exhaust 20, but in various embodiments, the temperature can be measured at other axial cross-sections, such as an axial cross-section 34 adjacent to fan 12, axial cross-section 36 adjacent to a high-pressure compressor 37, axial cross-section 38 adjacent to a combustor 16, to name a few examples.

Figure 2:
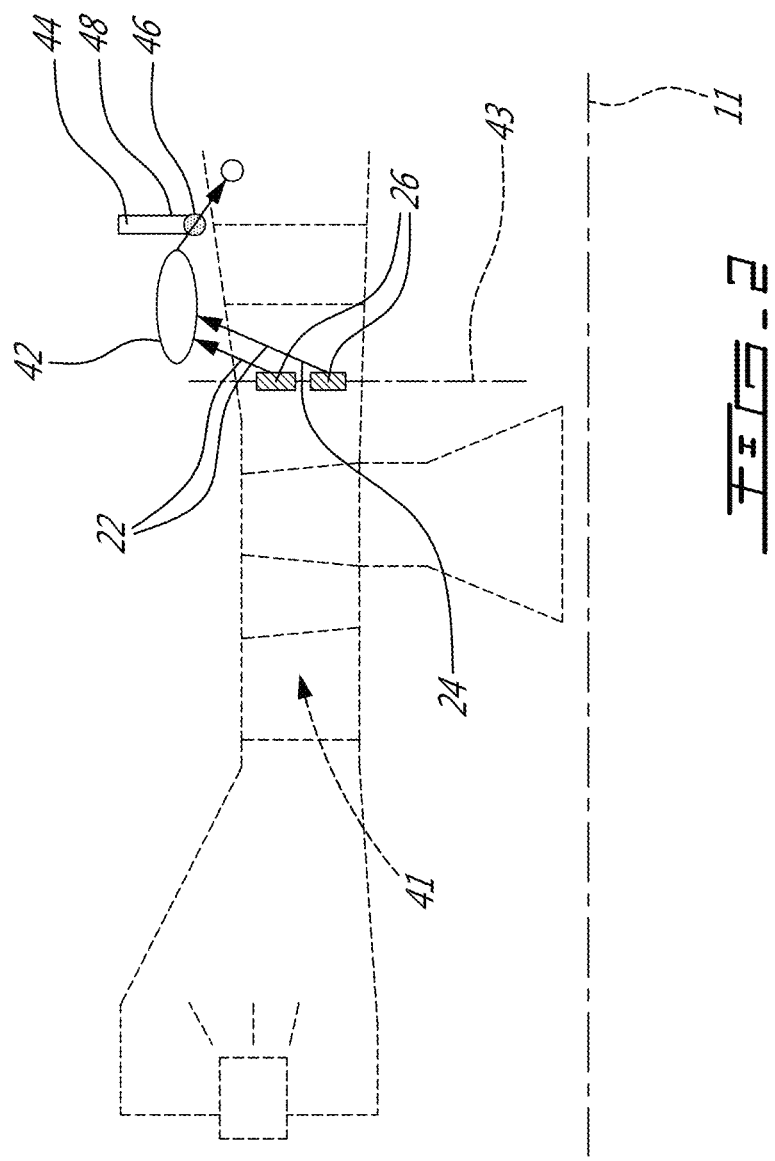
FIG. 2 is a schematic of an embodiment of a gas collector system for average temperature measurement, wherein the mixed gas is conveyed to a gas measuring chamber.

FIG. 2 is a schematic of an embodiment of a gas collector system for average temperature measurement. The gas collector system comprises a plurality of inlet conduit(s) 22 leading into a gas mixing chamber 42, each inlet conduit 24 comprises an inlet 28 configured to draw a corresponding gas sample, each gas sample drawn from a position (hereon referred to as a gas sample position) in an axial cross-section 43 of the gas path 41, the inlets 26 being circumferentially interspaced from one another around an axial cross section of the gas path 41. In various embodiments, the gas sample positions 56 may be equally interspaced from one another around the axial cross-section 43 or not, or may all be at a common radial distance away from central axis 11 or not.

Figure 12:
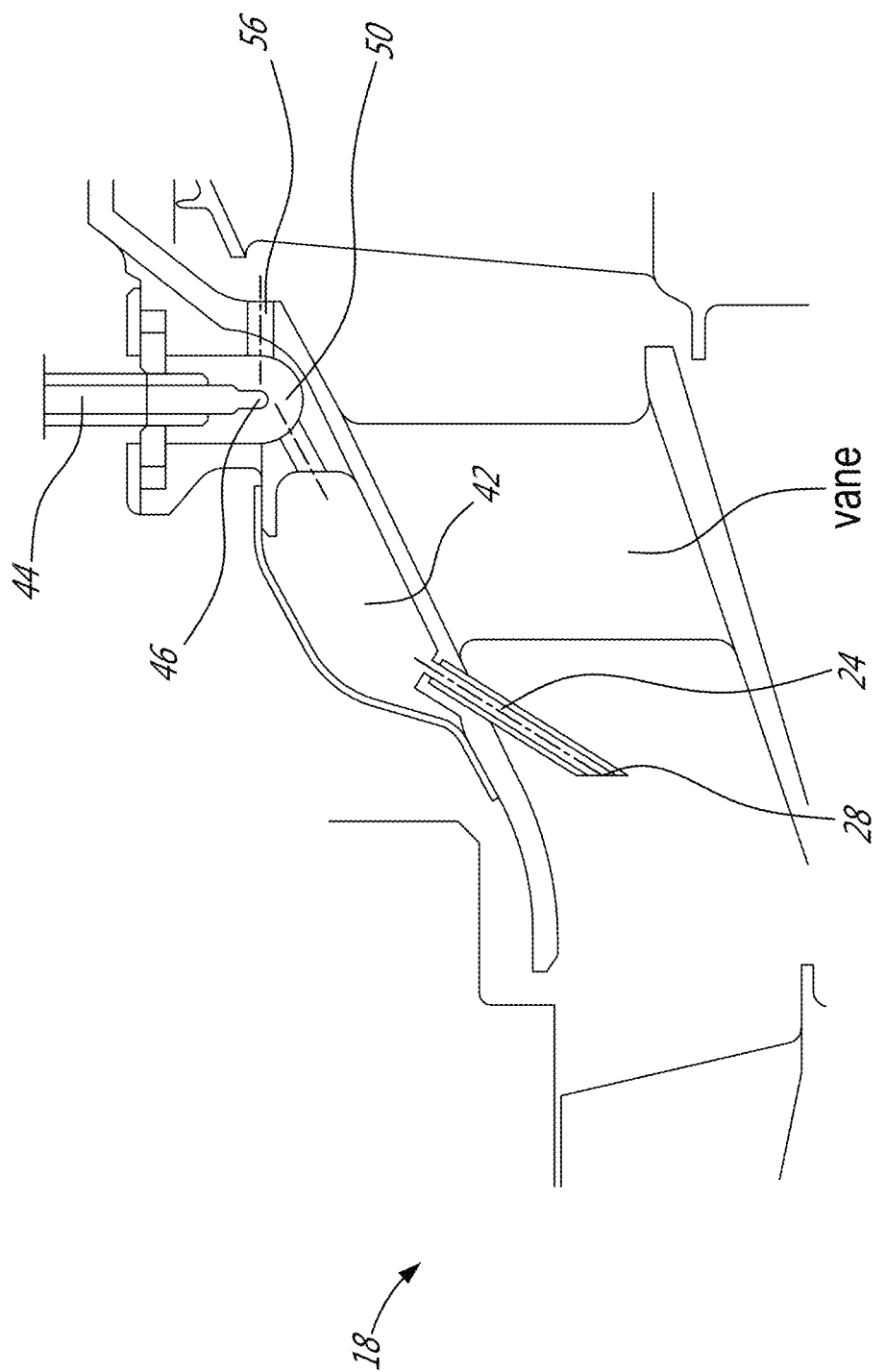
FIG. 12 is a schematic cross-sectional view of an embodiment of a gas collector system for average temperature measurement wherein an inlet conduit protrudes into the gas path.
Figure 13:
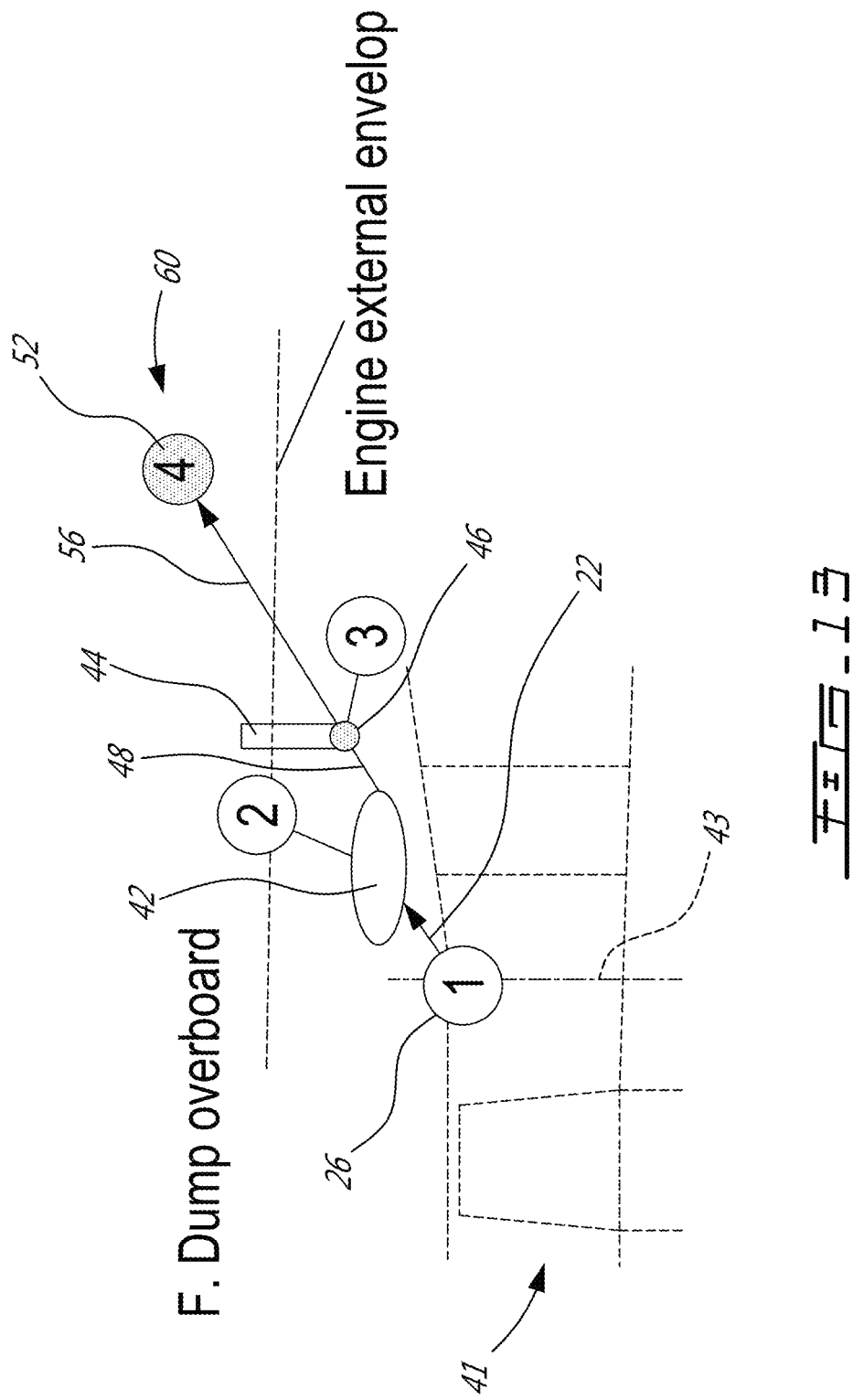
FIG. 13 is a schematic of an embodiment of a gas collector system for average temperature measurement wherein an outlet of an outlet conduit releases mixed gas into a space external to the gas turbine engine, the outlet located downstream of a temperature sensor probe.

The gas sample positions 56 can be at different radial depths in addition to different circumferential positions. In some embodiments, e.g. two specific embodiments for which more detail will be provided are illustrated in FIGS. 5-10, inlets 26 of one or more of the inlet conduit(s) 22 may be substantially flush with a surface of the gas turbine engine, the surface in contact with the gas path 41. In other embodiments, e.g. one specific embodiment for which more detail will be provided later is illustrated in FIGS. 12-13, an inlet conduit 24 may protrude into the gas path 41, which may allow collection of gas samples away from a gas turbine wall, i.e. in the bulk of the gas path 41. In various embodiments, an inlet conduit 24 may comprise, channels, perforations in solid elements connecting regions of fluids, or any other structure conveying fluid one from region to another, as will be apparent to one skilled in the art.

The inlet conduit 24 may convey gas samples to the gas mixing chamber 42 which is configured to form a mixed gas 48 from the gas samples. The gas mixing chamber 42 may comprise a substantially closed vessel, a recess open on one side, a channel, or any other structure, apparent to one skilled in the art, allowing fluid communication between gas samples conveyed to said gas mixing chamber 42. The gas mixing chamber 42 may comprise devices, obstructions, or other structures apparent one skilled in the art, which encourage fluid mixing and turbulence. Mixing of gas samples in the gas mixing chamber 42 may enable formation of a mixed gas 48 with substantially uniform temperature.

A temperature sensor 44 measures the temperature of the mixed gas obtained from the gas mixing chamber 42. The temperature sensor 44 may comprise a probe 46 exposed to the mixed gas. The temperature sensor 44 may be configured to measure a temperature of the mixed gas in a volume around the probe 46. In some embodiments, the volume may substantially be a point in space. In various embodiments, temperature sensor 44 may comprise one or more devices producing physical signals in response to stimuli, and one or more devices or methods to convert measurements of physical signals (e.g. electrical voltage, mechanical force, magnetic force) to a temperature reading, e.g. a digital signal processing system. For example, the temperature sensor 44 may comprise a thermocouple probe 46, a voltage measurement unit, and a method to calculate temperature as a function of the measured voltage.

The temperature of the mixed gas may be a measurement of the average temperature in an axial cross-section 43 of a gas turbine engine. The present disclosure is not limited to substantially exact measurements of average temperature in an axial cross-section 43 of a gas turbine engine. In some embodiments, the measurement of average temperature may only be indicative of the true average temperature in the axial cross-section 43. In various embodiments, the accuracy of average temperature measurement may be increased by increasing the number of distinct gas sample positions 56, distributing such positions more uniformly through the axial cross-section 43, or by any other method for increasing accuracy of a sampled average apparent to one skilled in the art. The accuracy of measurements may also be increased by reducing heat transfer to and from the mixed gas 48 prior to temperature measurement, the gas mixing chamber 42, or to and from any other space in the path of the gas samples or mixed gas 42 prior to temperature measurement.

Figure 3:
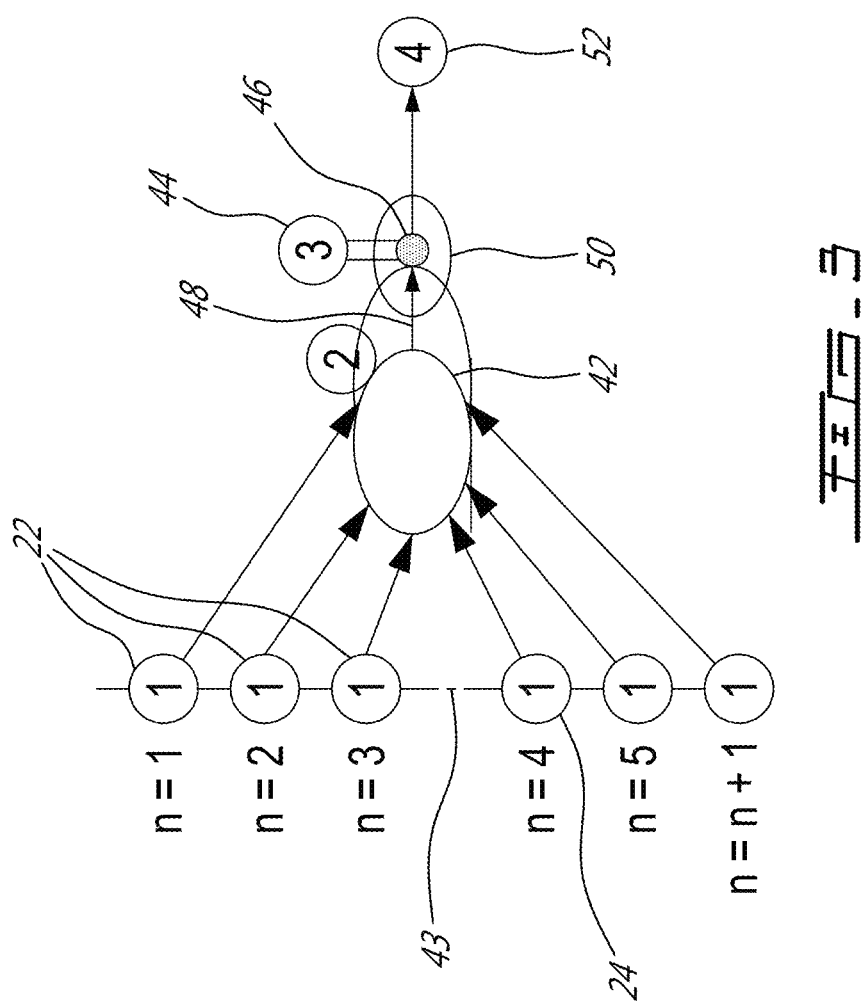
FIG. 3 is a schematic of another embodiment of a gas collector system for average temperature measurement.

FIG. 3 is a schematic of another embodiment of a gas collector system for average temperature measurement, wherein the mixed gas 48 is conveyed to a gas measuring chamber 50. In various embodiments, one or more mixed gas conduits convey mixed gas 48 from the gas mixing chamber 42 to a gas measuring chamber 50. The gas measuring chamber 50 may be a substantially closed chamber or a recess with one side open. In various embodiments, the temperature probe 46 may be placed inside the gas measuring chamber 50, upstream of the gas measuring chamber 50, or downstream of the gas measuring chamber 50.

Figure 4:
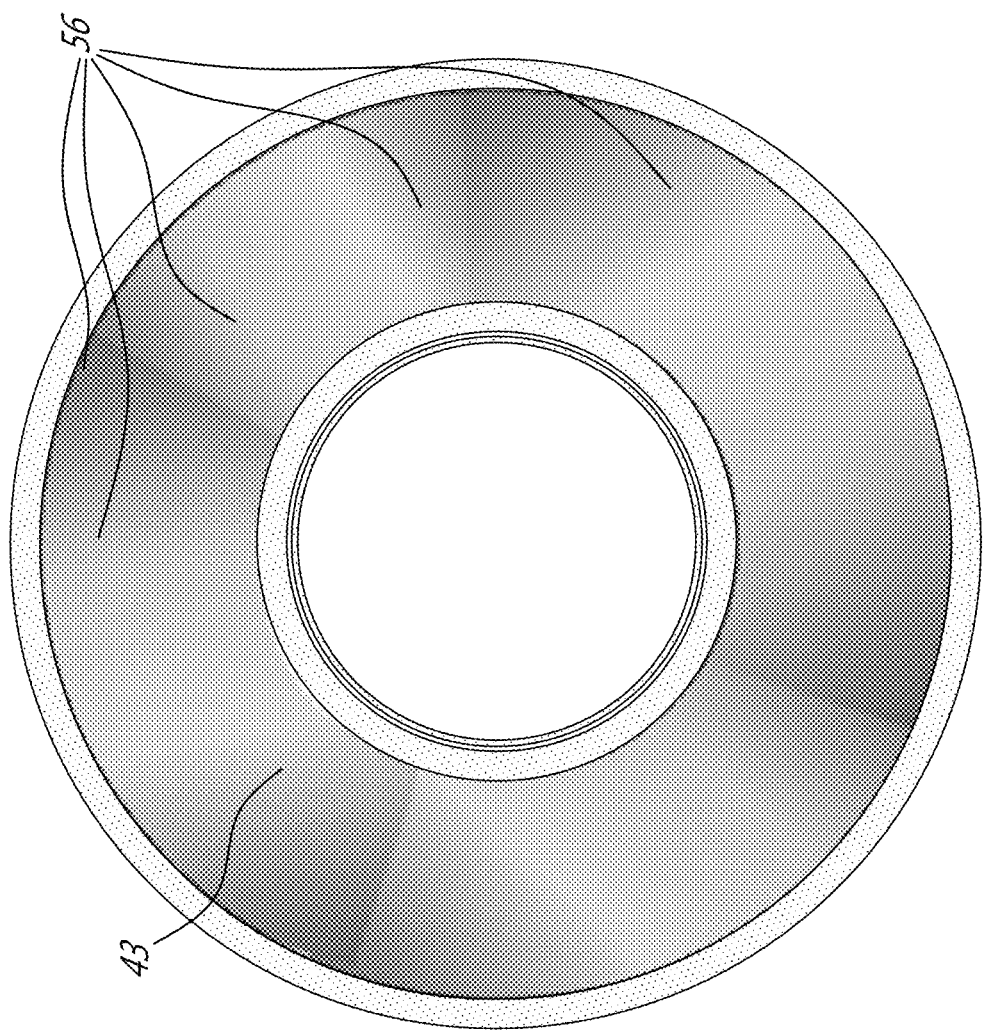
FIG. 4 is a schematic axial cross-sectional view of an embodiment of a gas collector system, wherein gas sample positions are shown distributed in the axial cross-section.

FIG. 4 is a schematic axial cross-sectional view of an embodiment of a gas collector system, wherein gas sample positions 56 are shown distributed in the axial cross-section 43. A gas sample position may be located anywhere in the axial cross-section 43. In various embodiments, the gas sample positions 56 are uniformly distributed, interspaced (equally or not) from one another around the axial cross-section 43, interspaced (equally or not) along a circumferential direction, equally interspaced along a radial direction, interspaced (equally or not) along an axial direction, or any other combination of radial, circumferential and radial interspacing.

Figure 5:
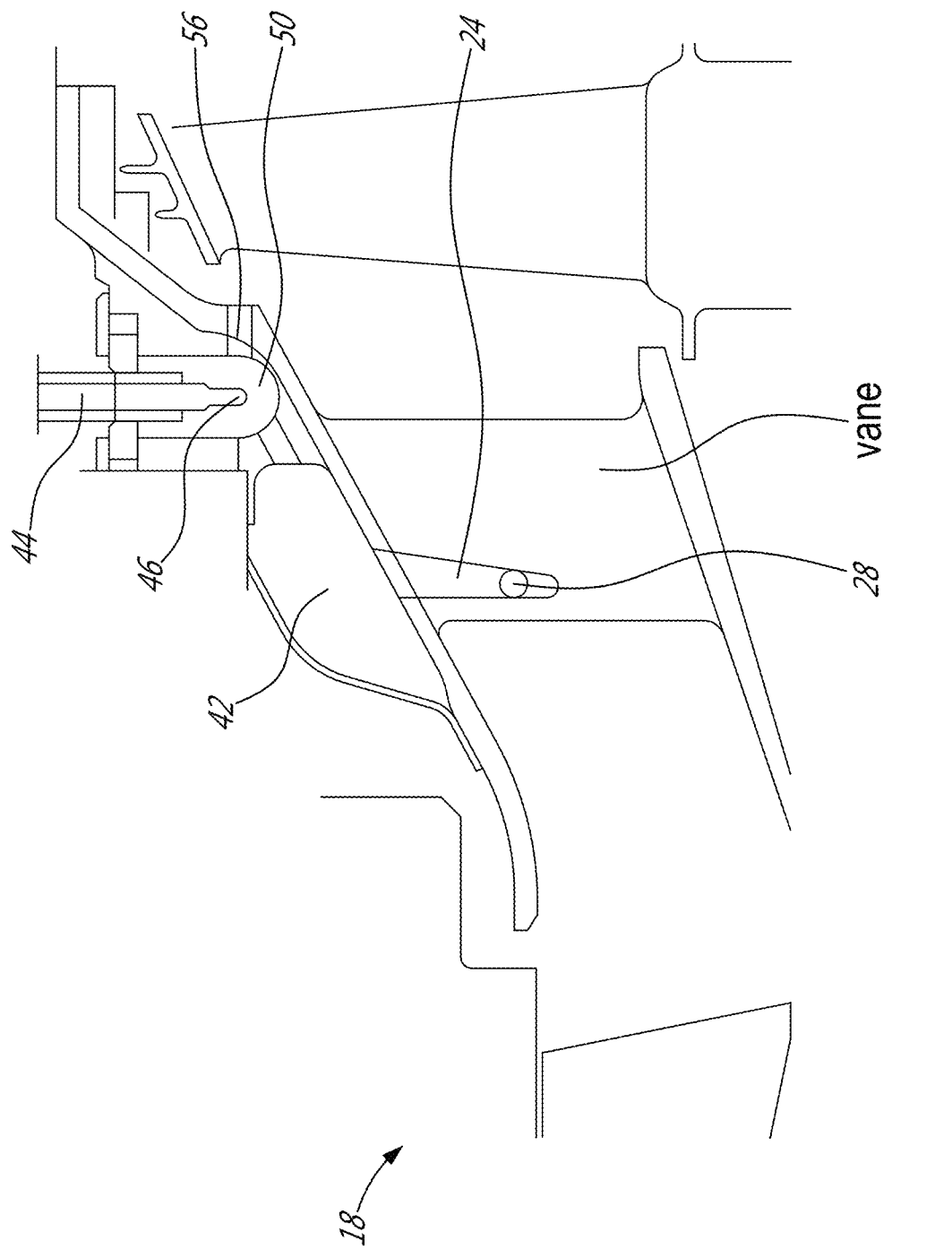
FIG. 5 is a schematic cross-sectional view of an embodiment of a gas collector system for average temperature measurement wherein an inlet of an inlet conduit is substantially flush with a surface in contact with the gas path.

FIG. 5 is a schematic cross-sectional view of an embodiment of a gas collector system for average temperature measurement wherein an inlet 28 of an inlet conduit 24 is substantially flush with a surface in contact with the gas path

41. In some embodiments, the inlet 28 of an inlet conduit 24 may be defined by an opening (e.g. a perforation or aperture) in a combination of one or more contiguous structural elements in (structural element assembly) of the gas turbine engine, the opening flush with a surface of the structural element assembly in contact with the gas path 41, the inlet conduit 24 defined within the body of the structural element assembly, one end of the inlet conduit 24 connected to the opening, and the other end of the inlet conduit 24 connected to the gas mixing chamber 42. In various embodiments, the structural element assembly may be a vane (e.g. in a turbine or compressor section), a vane in combination with a complementary annular wall housing as shown in FIG. 5, turbine blade, gas turbine shroud, driving shaft, or any other structural element assembly in contact with the gas path 41.

Figure 6:
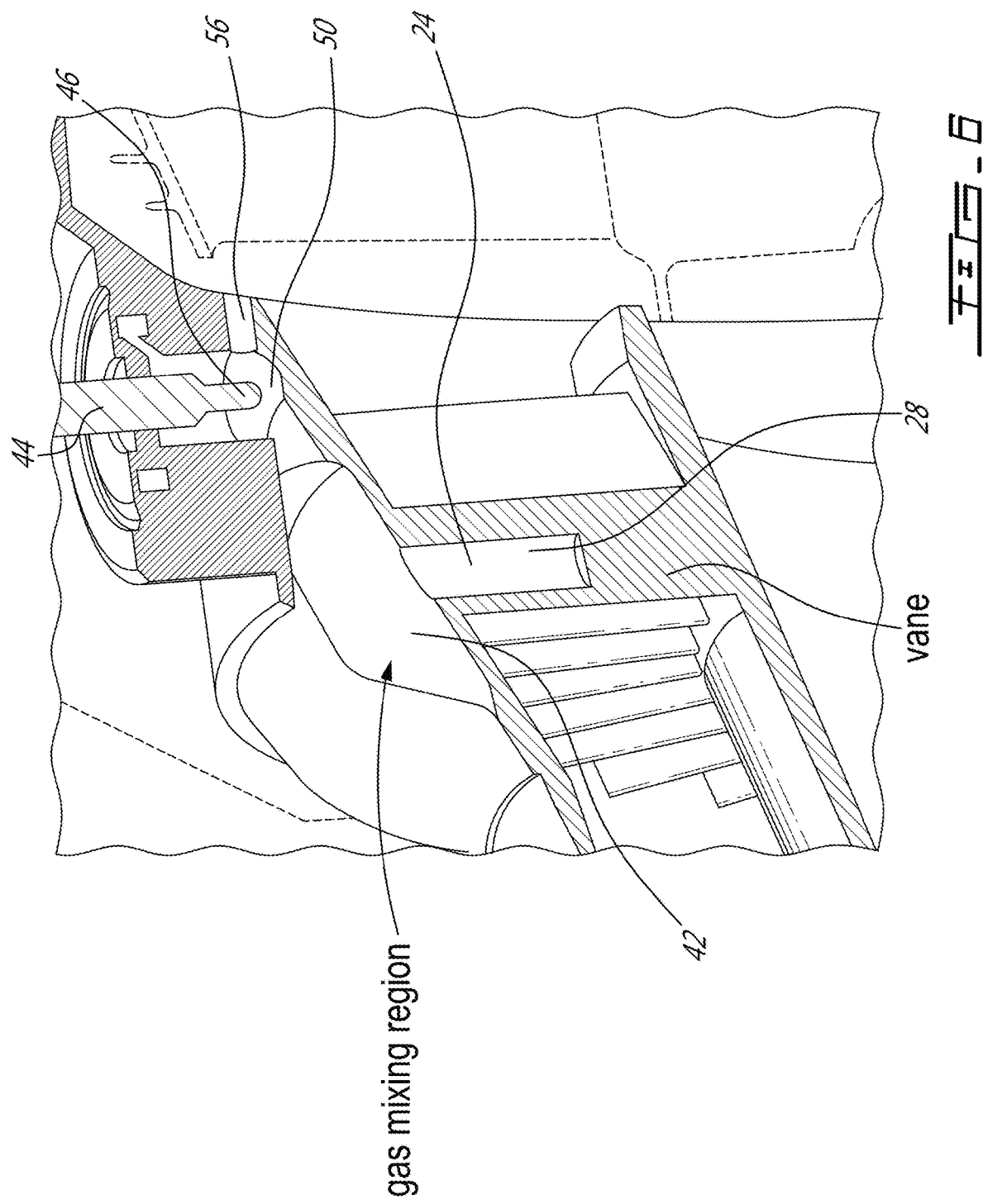
FIG. 6 is a sectional view of the gas collector system embodiment shown in FIG. 5.

FIG. 6 is a sectional view of the gas collector system embodiment shown in FIG. 5. The gas mixing chamber 42 may be formed on the outside of an annular wall of the gas turbine engine in the space between the outside of the annular wall and a complementary structure covering the annular wall, the complementary structure having a section protruding away from the outside of the annular wall to form a gas mixing region. The radius of the annular wall may change with axial length, forming an inclined annular wall. In various embodiments, inclination of said annular wall increases or decreases the volume of gas mixing region. The protruding section may be complementary to a cylindrical wall enclosing an axial length of the annular wall. The outside of an inclined annular wall may form an intersection with the inside of the cylindrical wall. One end of the protruding section may fit within the cylindrical wall, forming a substantially closed volume with the inside of the cylindrical wall and outside of the (possibly inclined) annular wall. The annular wall may be a housing for vanes in a compressor or turbine section of the gas turbine engine. An inlet conduit 24 may be defined within the body of the vane and adjacent annular wall housing, the outlet of the inlet conduit 24 in fluid communication with the gas mixing chamber 42 formed on the outside of the annular wall housing.

A mixing conduit may connect the gas mixing chamber 42 with a gas measuring chamber 50. One end of said channel open to the gas mixing chamber 42 and the other end may open to the gas measuring chamber 50. One end of the channel may be an opening formed in the intersection between the annular and cylindrical walls, and the other end may be an opening in the gas measuring chamber 50. A temperature probe 46 may be positioned inside the gas measuring chamber 50, said gas measuring chamber 50 substantially enclosing said temperature probe 46. A outlet conduit 56 may have an opening in the gas measuring chamber 50, with another opening in the region where the mixed gas is to be released. The outlet conduit 56 may comprise a closed channel.

Figure 7:
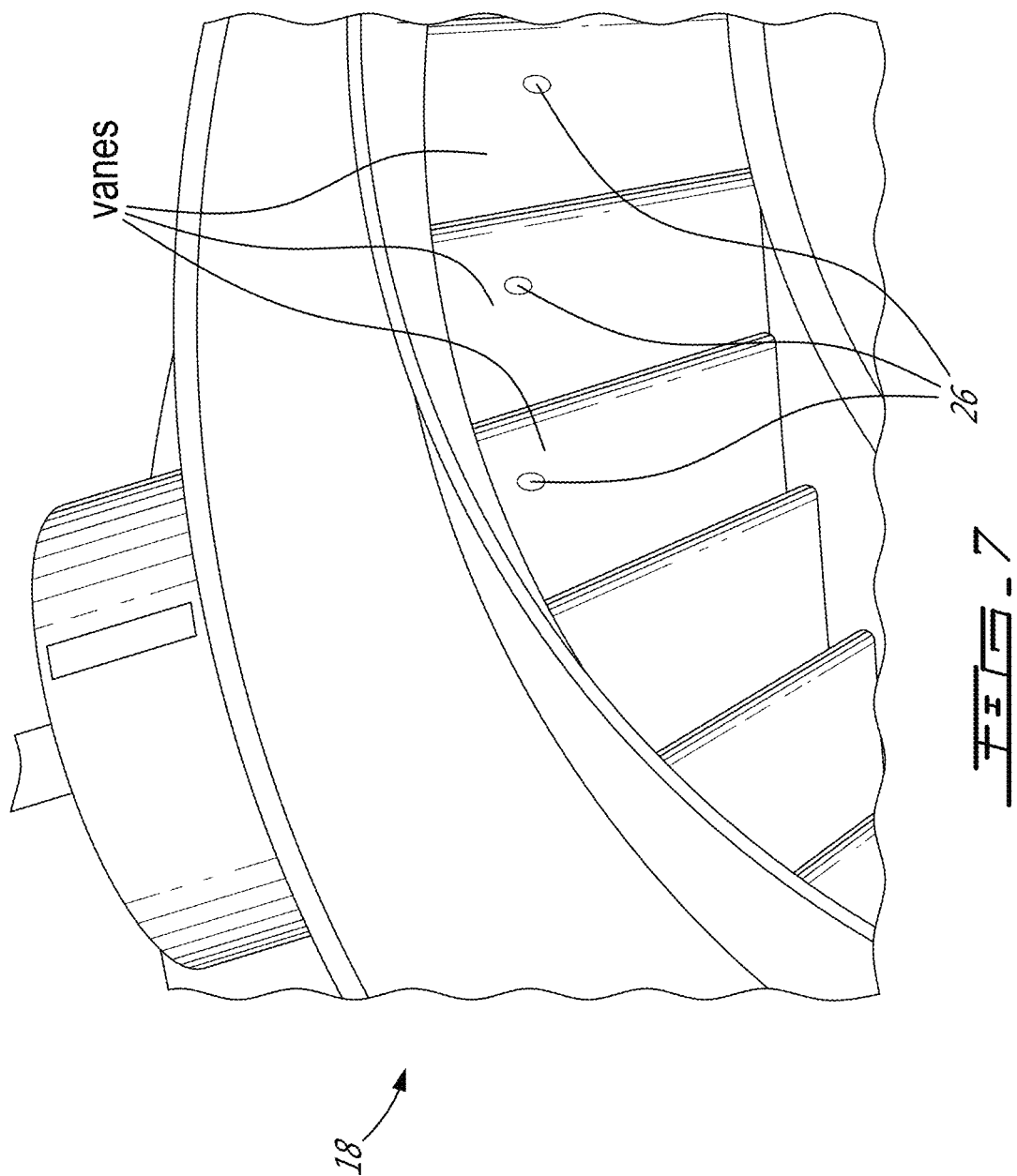
FIG. 7 is a perspective view of the gas collector system for average temperature measurement embodiment shown in FIG. 5.

FIG. 7 is a perspective view of the gas collector system for average temperature measurement embodiment shown in FIG. 5 and FIG. 6. Each vane may have an inlet conduit 24 to collect gas.

Figure 8:
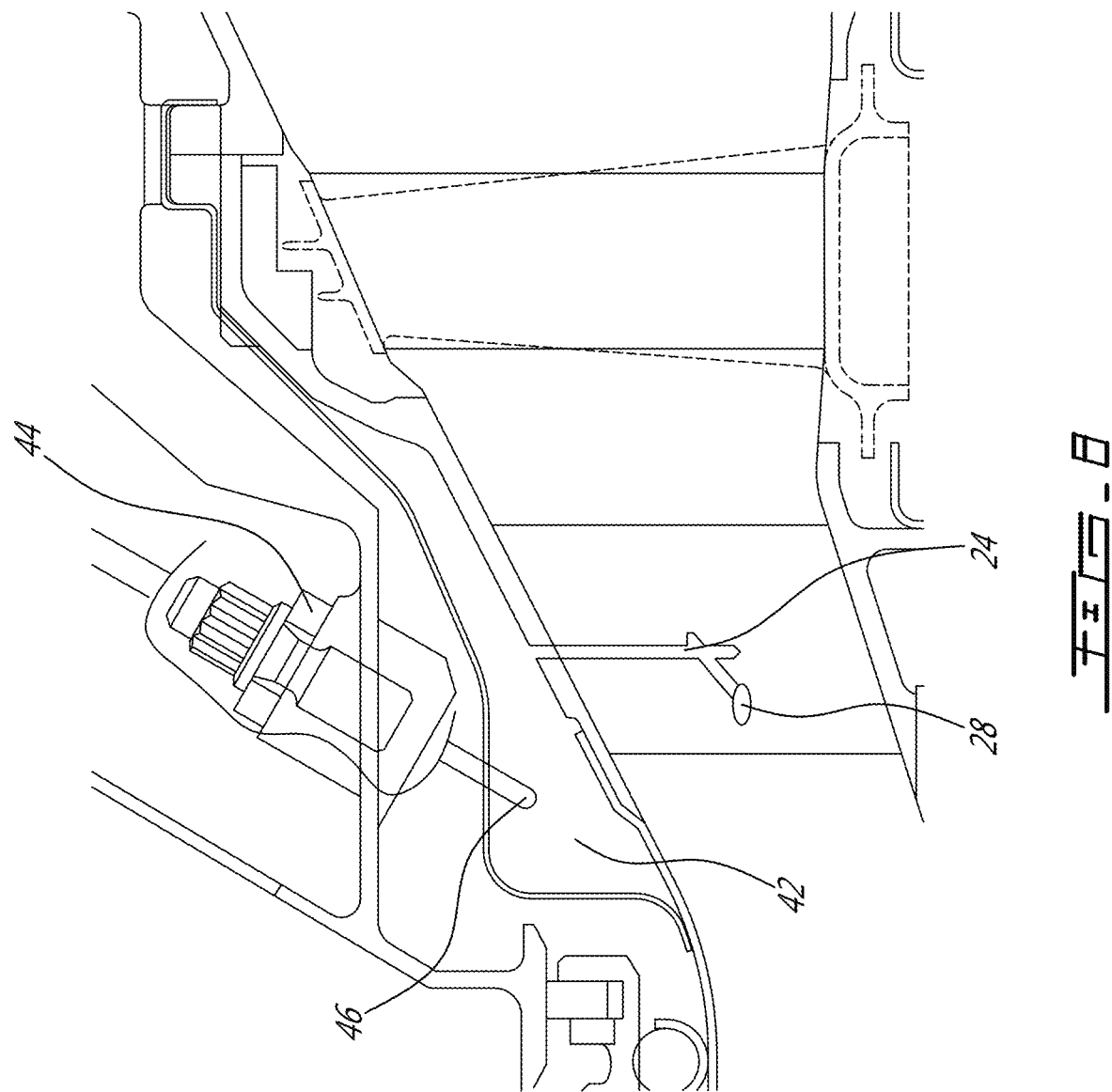
FIG. 8 is a schematic cross-sectional view of an embodiment of a gas collector system for average temperature measurement wherein a temperature probe is plunged into the mixing chamber.

FIG. 8 is a schematic cross-sectional view of an embodiment of a gas collector system for average temperature measurement wherein a temperature probe 46 is plunged into the mixing chamber. The embodiment in FIG. 8 is similar to the embodiment shown FIGS. 5-7, except the embodiment of FIG. 8 does not comprise mixing conduits and a gas measuring chamber 50. In this embodiment and others, the temperature is thus measured directly within a region of the gas mixing chamber 42. A temperature probe 46 may be directly plunged into the gas mixing chamber 42, the plunging may be in a position wherein the mixed gas may be predominant, e.g. in a region away from the outlets of the inlet conduit(s) 22.

Figure 9:
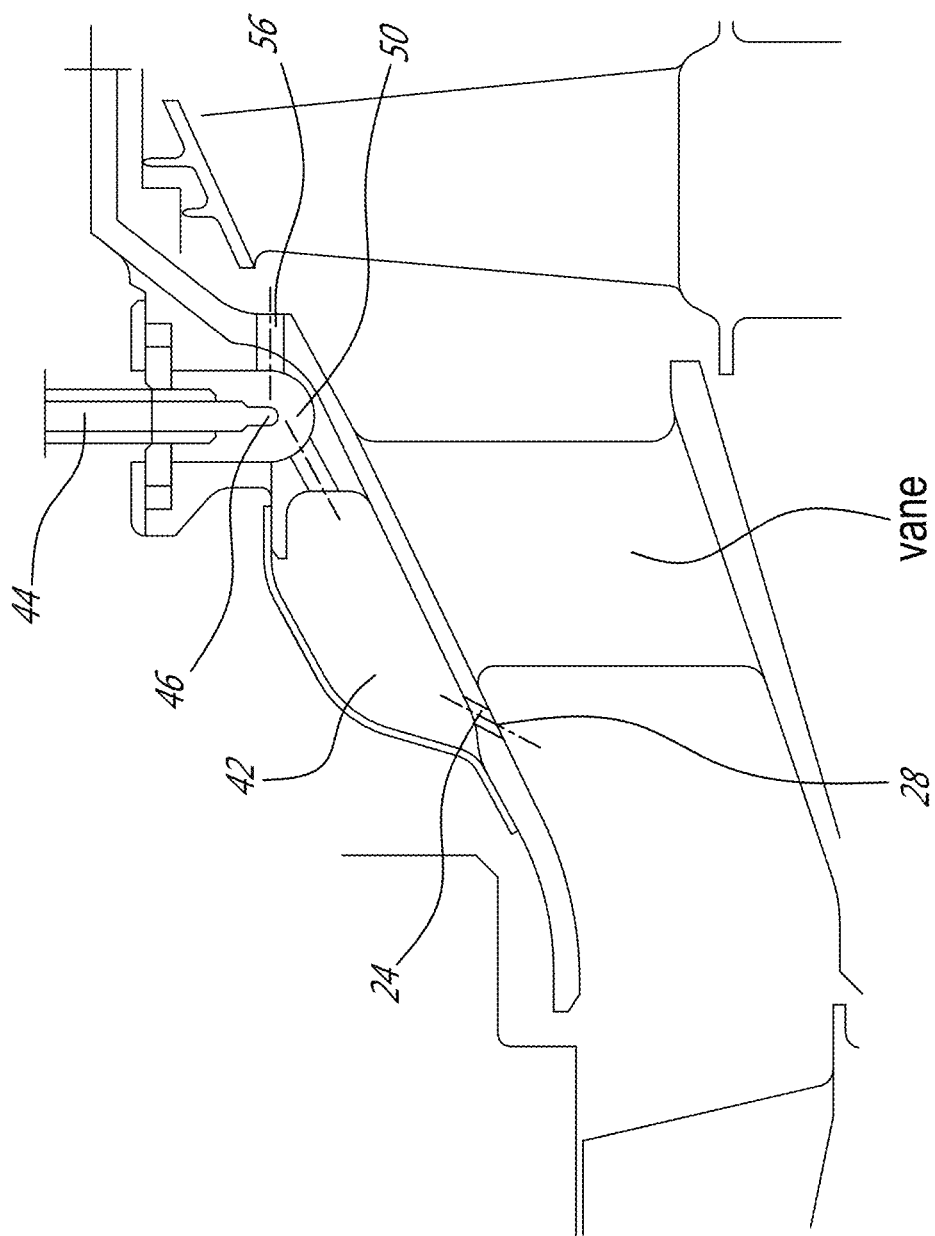
FIG. 9 is a schematic cross-sectional view of an embodiment of a gas collector system for average temperature measurement wherein an inlet of an inlet conduit is substantially flush with a surface in contact with the gas path, the inlet conduit comprising an opening in a gas turbine wall, the opening having one axial end facing the gas path and other axial end facing a gas mixing chamber.

FIG. 9 is a schematic cross-sectional view of an embodiment of a gas collector system for average temperature measurement wherein an inlet 28 of an inlet conduit 24 is substantially flush with a surface in contact with the gas path 41, the inlet conduit 24 comprising an opening in a gas turbine wall, the opening having one axial end facing the gas path 41 and other axial end facing a gas mixing chamber 42. The embodiment of FIG. 9 is similar to the embodiment FIGS. 5-7, except the inlet conduit 24 is formed within the annular wall housing of the vanes instead of the vanes themselves. In this and other embodiments, inlet conduit(s) 22 may comprise openings in an annular wall of the gas turbine engine leading to an adjacent gas mixing chamber 42 formed on the outside of the annular wall by a structure covering the outside wall, said structure having a protruding section, said protruding having one end fit into the inside of a cylindrical wall, said cylindrical wall partially enclosing the annular wall. One end of the openings may be the inlets 26 of the inlet conduit(s) 22, said inlets 26 or openings facing the gas path 41, and the other end of the openings may face the gas mixing chamber 42. The openings may be perforations in the annular wall. In various embodiments, the shape, size, position, and quantity of openings may be varied.

Figure 10:
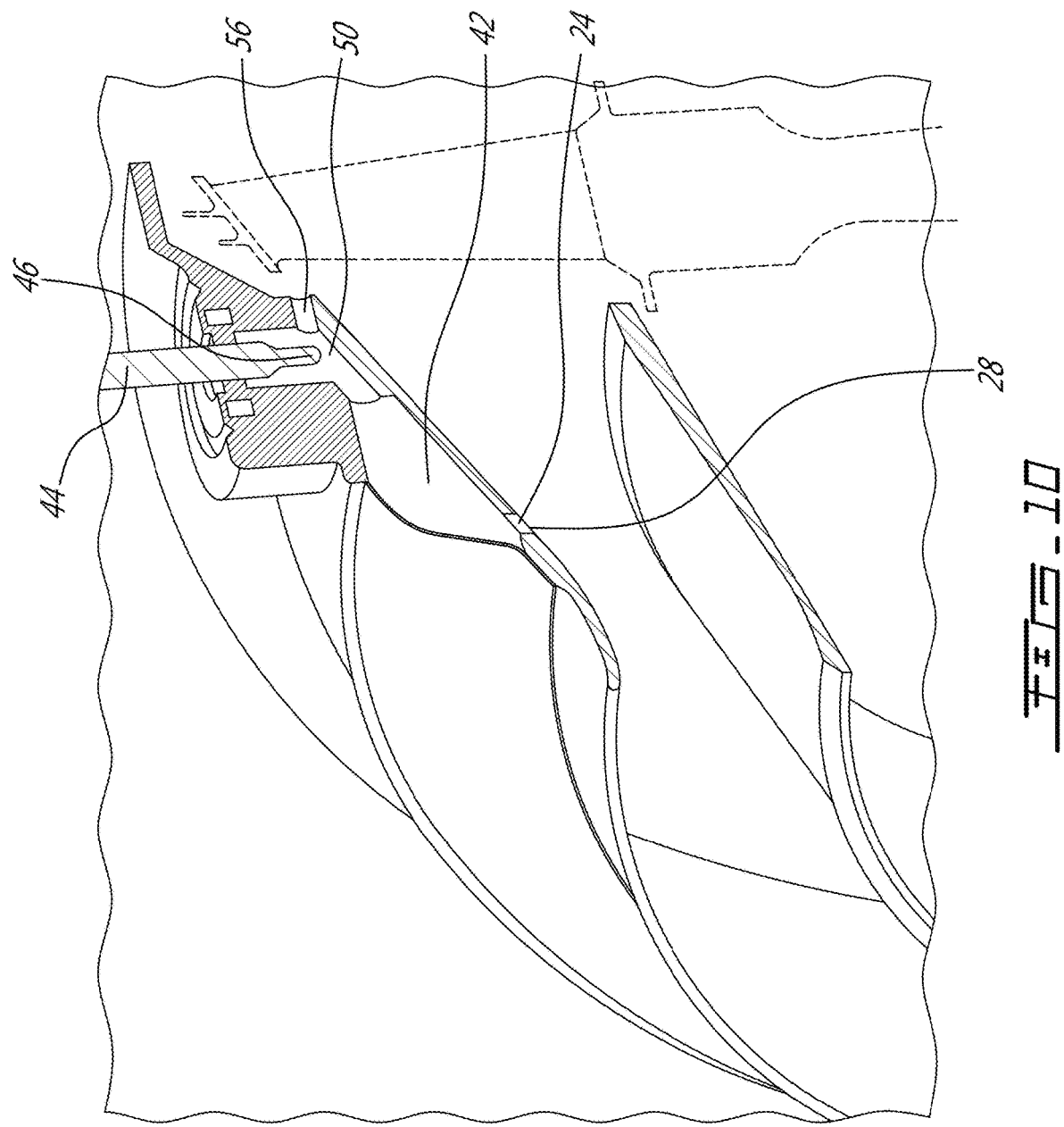
FIG. 10 is a sectional view of the gas collector system for average temperature measurement embodiment shown in FIG. 9.
Figure 11:
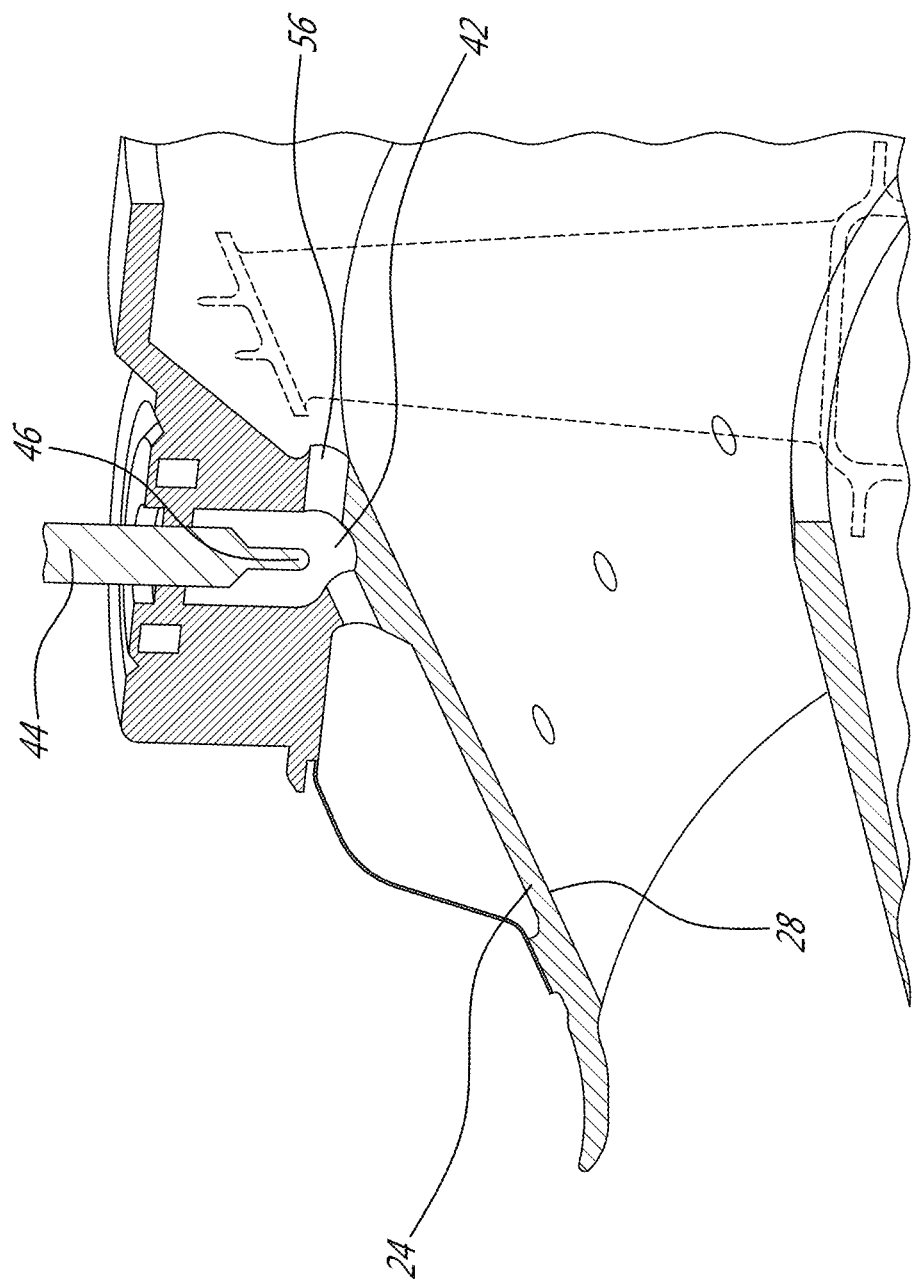
FIG. 11 is another sectional view of the gas collector system or average temperature measurement embodiment shown in FIG. 9.

FIGS. 10 and 11 are sectional views of the gas collector system for average temperature measurement embodiment shown in FIG. 9. The openings may distributed along the circumference of the annular wall. The openings may be equally spaced.

FIG. 12 is a schematic cross-sectional view of an embodiment of a gas collector system for average temperature measurement wherein an inlet conduit 24 protrudes into the gas path 41. The embodiment of FIG. 9 is similar to the embodiment FIGS. 5-7, except the inlet conduit 24 comprises an elongated portion positioned within the gas path 41, In this and other embodiments, an inlet conduit 24 may comprise a protruding channel (e.g. a tube or spoke) extending from the annular wall in a direction pointing away from the outside of the annular wall into the gas path 41. The inlet 28 of the inlet conduit 24 may comprise a shaped scoop to draw in gas. For example, the inlet 28 of the inlet conduit 24 may be comprise an inclined channel inlet, said inclination ensuring that the inlet 28 of the inlet conduit 24 to face a direction substantially perpendicular to a predicted or average gas flow in the gas path 41. The inlet conduit 24 may lead to an adjacent gas mixing chamber 42 formed on the outside of the annular wall by a structure covering the outside wall, said structure having a protruding section, said protruding having one end fit into the inside of a cylindrical wall, said cylindrical wall partially enclosing the annular wall. In various embodiments, the shape, size, position, and quantity of protruding channels may be varied.

FIG. 13 is a schematic of an embodiment of a gas collector system for average temperature measurement wherein an outlet 52 of an outlet conduit 56 releases mixed gas into a space 60 external to the gas turbine engine, the outlet located downstream of a temperature sensor probe 46. In various embodiments, after measuring the temperature of the mixed gas, the mixed gas is conveyed by outlet conduits 58 to a location within or outside the gas turbine engine to be released.

Figure 14:
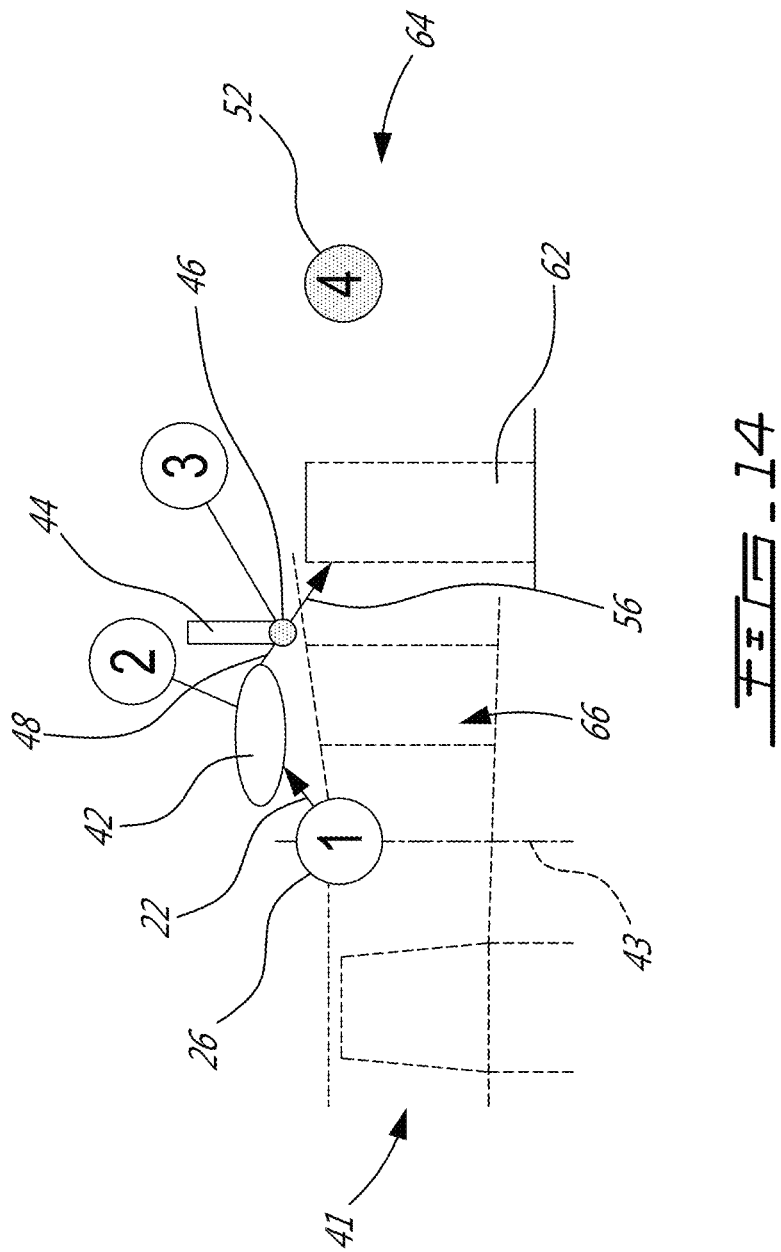
FIG. 14 is a schematic of an embodiment of a gas collector system for average temperature measurement wherein an outlet of an outlet conduit releases mixed gas upstream of a low-pressure turbine rotor, the outlet located downstream of a temperature sensor probe.

FIG. 14 is a schematic of an embodiment of a gas collector system for average temperature measurement wherein an outlet 52 of an outlet conduit 56 releases mixed gas in the gas path 41 upstream 66 of a rotor 62 of a low-pressure turbine 31, the outlet located downstream of a temperature sensor probe 46.

Figure 15:
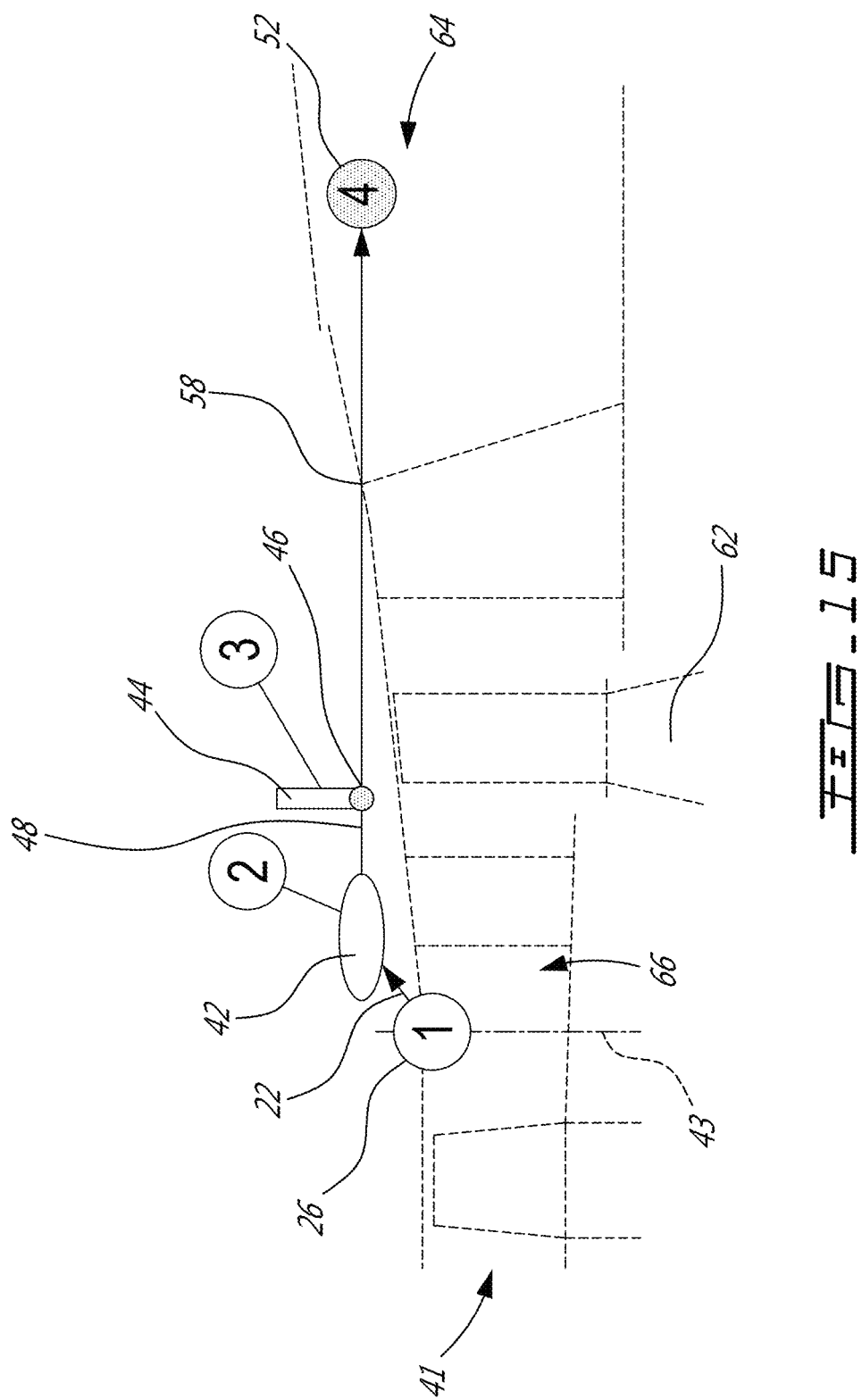
FIG. 15 is a schematic of an embodiment of a gas collector system for average temperature measurement wherein an outlet of an outlet conduit releases mixed gas downstream of a low-pressure turbine rotor, the outlet located downstream of a temperature sensor probe.

FIG. 15 is a schematic of an embodiment of a gas collector system for average temperature measurement wherein an outlet 52 of an outlet conduit 56 releases mixed gas in the gas path 41 downstream 64 of a rotor 62 of a low-pressure turbine 31, the outlet located downstream of a temperature sensor probe 46.

FIG. 16 is a schematic of an embodiment of a gas collector assembly comprising a plurality of a gas collector systems gas collector system for average temperature measurement. Multiple gas collector systems for average temperature measurement may be implemented in a gas turbine engine to provide redundancy in case of failure and improve accuracy of average temperature measurements. In various embodiments, a plurality of inlet conduit(s) 22 are used to form a mixed gas or a plurality of sets of inlet conduit(s) 22 are used so that each set forms a distinct mixed gas.

During operation, some of the gas in the gas path 41 is diverted by the inlets 26 and inlet conduits 22 and flows through all the inlet conduit(s) 22 into the gas mixing chamber 42, The gas samples from the different inlet conduit(s) 22 come into contact in the gas mixing chamber 42 and become mixed, forming a mixed gas 48. The temperature of the mixed gas 48 is then measured to infer an average temperature in the axial cross-section 43 of the gas turbine engine. In various embodiments, the temperature is measured directly in the gas mixing chamber 42 by plunging a temperature probe 46 into the chamber or the mixed gas 48 flows out of the gas mixing chamber 42 before temperature is measured, e.g. mixed gas 48 may flow into a gas measuring chamber 50 containing a temperature probe 46.

After temperature measurement, the mixed gas may be released. In some embodiments, after temperature measurement, the mixed gas may be conveyed by one or more outlet conduits 58 before being released. In various embodiments, the gas sample is released into a space 60 external to the gas turbine engine, within the gas turbine engine, within the gas turbine bypass 39, or any other space. In various embodiments, the mixed gas is released upstream of the axial cross-section 43, downstream of the axial cross-section 43, or substantially in the axial cross-section 43.

The above description is meant to be exemplary only, and one skilled in the art will recognize that changes may be made to the embodiments described without departing from the scope of the invention disclosed. For example, inlet 22 or outlet conduits 58 may comprise rigid or flexible tubing, temperature sensor 44 may comprise a single or multiple integral components, mixed gas may be released anywhere in the gas turbine body or external to the gas turbine, hydraulic components such orifices and expanders may be used anywhere in the inlet 22 or outlet conduits 58 to change pressure and flow rate into and out of gas mixing chamber 42, valves may be included in inlet 22 and outlet conduits 58 to control the flow of gas, flow straighteners may be used prior to releasing the gas, or turbulence-promoting devices may be incorporated into the mixing chamber to increase mixing efficiency, Still other modifications which fall within the scope of the present invention will be apparent to those skilled in the art, in light of a review of this disclosure, and such modifications are intended to fall within the appended claims.

The invention claimed is:

1. A method for determining an average temperature of gas in an axial cross-section of a gas turbine engine having a gas path, the method comprising:
    sampling a plurality of gas samples from the gas path at positions in the axial cross-section circumferentially spaced from one another, the sampling of the plurality of the gas samples including diverting the plurality of gas samples away from the gas path;
    mixing the gas samples outside the gas path to form a mixed gas having a uniform temperature;
    measuring the uniform temperature of the mixed gas, the uniform temperature of the mixed gas corresponding to the average temperature of the gas; and
    releasing the mixed gas to the gas path after said measuring.

2. The method of claim 1, wherein the positions in the axial cross-section lie in a common plane.

3. The method of claim 1, wherein the positions in the axial cross-section are equally interspaced from one another around the axial cross-section.

4. The method of claim 1, comprising conveying the diverted gas samples to a gas mixing chamber.

5. The method of claim 1, comprising conveying the mixed gas to a gas measuring chamber, wherein the measuring is performed in the gas measuring chamber.

6. The method of claim 1, comprising releasing the mixed gas upstream of a low-pressure turbine rotor, after said measuring.

7. The method of claim 1, comprising releasing the mixed gas downstream of a low-pressure turbine rotor, after said measuring.

8. The method of claim 1, comprising releasing the mixed gas into a space external to the gas turbine engine, after said measuring.

9. The method of claim 1, wherein the axial cross-section is in a turbine section of the gas turbine engine.

10. An average temperature determination device for an axial cross-section of a gas path of a gas turbine engine, the device comprising:
    a gas mixing chamber configured to receive a mixed gas;
    inlet conduits conveying gas samples from a plurality of circumferential positions in the axial cross-section to the gas mixing chamber, wherein a plurality of samples of gas are diverted from the gas path via the inlet conduits to the gas mixing chamber; and
    a temperature sensor placed within the gas mixing chamber, the temperature sensor configured to measure a temperature of the mixed gas within the gas mixing chamber after the gas samples are diverted to the gas mixing chamber, the temperature of the mixed gas corresponding to an average temperature of the gas.

11. The device of claim 10, wherein the mixed gas is released back to the gas path after said measuring.

12. The device of claim 11, comprising releasing the mixed gas upstream of a low-pressure turbine rotor, after said measuring.

13. The device of claim 11, comprising releasing the mixed gas downstream of a low-pressure turbine rotor, after said measuring.

14. The device of claim 10, wherein the inlet conduits are positioned circumferentially spaced from one another in the axial cross-section of the gas turbine engine.

15. The device of claim 12, wherein the inlet conduit positions in the axial cross-section lie in a common plane.

16. The device of claim 12 wherein the inlet conduit positions in the axial cross-section are equally interspaced from one another around the axial cross-section.

17. The device of claim 12, comprising releasing the mixed gas into a space external to the gas turbine engine, after said measuring.

18. The device of claim 12, wherein the axial cross-section is in a turbine section of the gas turbine engine.

\* \* \* \* \*